(12) United States Patent
Hu et al.

(10) Patent No.: US 12,229,612 B1
(45) Date of Patent: Feb. 18, 2025

(54) CONTACTLESS CARD WITH DYNAMIC PROTECTION AGAINST COVERT RADIO FREQUENCY READING

(71) Applicant: JPMORGAN CHASE BANK, N.A., New York, NY (US)

(72) Inventors: Shaohan Hu, Yorktown Heights, NY (US); Youngwook Do, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/417,266

(22) Filed: Jan. 19, 2024

(51) Int. Cl.
G06K 19/073 (2006.01)
G06K 19/077 (2006.01)

(52) U.S. Cl.
CPC . G06K 19/07318 (2013.01); G06K 19/07773 (2013.01)

(58) Field of Classification Search
CPC ....... G06K 19/07318; G06K 19/07773; G06K 19/00; G06K 19/07; G06K 19/067; G06Q 20/34; G06Q 20/341
USPC ......... 235/492, 380, 487, 375; 343/700, 702
See application file for complete search history.

(56) References Cited

U.S. PATENT DOCUMENTS

| | | | |
|---|---|---|---|
| 2008/0297421 A1* | 12/2008 | Kriebel | H01Q 1/38 343/702 |
| 2018/0330220 A1* | 11/2018 | Gaspari | H01Q 7/00 |
| 2023/0198140 A1* | 6/2023 | Ali | H01L 21/4846 |

FOREIGN PATENT DOCUMENTS

| | | | | |
|---|---|---|---|---|
| WO | WO-2015172053 A1 * | 11/2015 | ....... | G06K 19/07766 |
| WO | WO-2023073422 A1 * | 5/2023 | ............. | B42D 25/24 |

\* cited by examiner

*Primary Examiner* — Edwyn Labaze (74) *Attorney, Agent, or Firm* — GREENBERG TRAURIG LLP (57) ABSTRACT

A contactless card may include: a first card portion and a second card portion; a manipulation area between the first card portion and the second card portion, wherein the contactless card may be manipulatable about the manipulation area; a chip storing information; and an antenna in communication with the chip comprising a first antenna portion in the first card portion and a second antenna portion in the second card portion, wherein the first antenna portion and the second antenna portion are electrically connected when the contactless card is in a first orientation such that the information can be read by radio frequency communication from the chip via the antenna, and the first antenna portion and the second antenna portion are electrically disconnected when the contactless card is in a second orientation such that the information cannot be read by radio frequency communication from the chip via the antenna.

18 Claims, 10 Drawing Sheets

CONTACTLESS CARD WITH DYNAMIC PROTECTION AGAINST COVERT RADIO FREQUENCY READING

BACKGROUND OF THE INVENTION

1. Field of the Invention

Embodiments relate to contactless cards with dynamic protection against covert radio frequency reading.

2. Description of the Related Art

Modern credit cards and debit cards are equipped with technology that allows certain information to be passively read by a reader when the card is in the proximity of the reader. While this is a convenience, it also makes the information on the card vulnerable to being read by a malicious actor.

To protect their cards from covert reading, some individuals store their cards in radio frequency blocking wallets. While some wallets are effective, others are not and still leave cards vulnerable to covert reading. And this requires the individual to buy another item.

SUMMARY OF THE INVENTION

Contactless cards with dynamic protection against covert radio frequency reading are disclosed. According to an embodiment, a contactless card may include: a first card portion and a second card portion; a manipulation area between the first card portion and the second card portion, wherein the contactless card may be manipulatable into a plurality of orientations about the manipulation area; a chip storing information; and an antenna in communication with the chip comprising a first antenna portion in the first card portion and a second antenna portion in the second card portion, wherein the first antenna portion and the second antenna portion are electrically connected when the contactless card is in a first orientation of the plurality of orientations such that the information can be read by radio frequency communication from the chip via the antenna, and the first antenna portion and the second antenna portion are electrically disconnected when the contactless card is in a second orientation of the plurality of orientations such that the information cannot be read by radio frequency communication from the chip via the antenna.

In one embodiment, the first orientation may be a non-planar orientation, and the second orientation may be a planar orientation.

In one embodiment, the manipulation area may include a hinge, a pivot point, etc.

In one embodiment, the contactless card may be biased in the first orientation. In another embodiment, the contactless card may be biased in the second orientation.

In one embodiment, the contactless card may also include a second chip storing second information, wherein the antenna is in communication with the chip when the contactless card is in the first orientation such that the information can be read by radio frequency communication from the chip via the antenna, and the antenna is in communication with the second chip when the contactless card is in a third orientation of the plurality of orientations such that the second information can be read by radio frequency communication from the second chip via the antenna.

In one embodiment, the contactless card may include a financial instrument, and the information may include financial instrument information.

In one embodiment, the contactless card may include an access card, and the information may include identification information.

According to another embodiment, a method may include: (1) receiving a contactless card comprising a first card portion and a second card portion, a manipulation area between the first card portion and the second card portion, wherein contactless card may be manipulatable into a plurality of orientations about the manipulation area, a chip storing information, and an antenna in communication with the chip comprising a first antenna portion in the first card portion and a second antenna portion in the second card portion; (2) manipulating the contactless card into a first orientation of the plurality of orientations, wherein the first antenna portion and these second antenna portion are electrically connected such that the information can be read by radio frequency communication from the chip via the antenna; and (3) manipulating the contactless card into a second orientation of the plurality of orientations, wherein the first antenna portion and these second antenna portion are electrically disconnected when the contactless card such that the information cannot be read by radio frequency communication from the chip via the antenna.

In one embodiment, the first orientation may be a non-planar orientation, and the second orientation may be a planar orientation.

In one embodiment, the manipulation area may include a hinge, a pivot point, etc.

In one embodiment, the contactless card may be biased in the first orientation. In another embodiment, the contactless card may be biased in the second orientation.

In one embodiment, the contactless card may also include a second chip storing second information, and the method may also include: manipulating the contactless card into a third orientation of the plurality of orientations, wherein the first antenna portion and these second antenna portion are electrically connected such that the second information can be read by radio frequency communication from the second chip via the antenna.

In one embodiment, the contactless card may include a financial instrument, and the information may include financial instrument information.

In another embodiment, the contactless card may include an access card, and the information may include identification information.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to contactless cards with for dynamic protection against covert radio frequency reading.

In embodiments, a contactless card, such as a credit card, an access card, etc. may be readable only when it is manipulated into one or more specific configurations, shapes, or orientations. When in one or more of these configurations, shapes, or orientations, the antenna for the contactless card may be electrically connected to a chip on the contactless card, thereby enabling the antenna to be used to passively read information on the chip. When the contactless card is not in one of the specific shapes, the connection with or within the antenna may be electrically broken, thereby disabling the antenna and preventing the information on the chip from being read contactlessly.

Figure 1A:
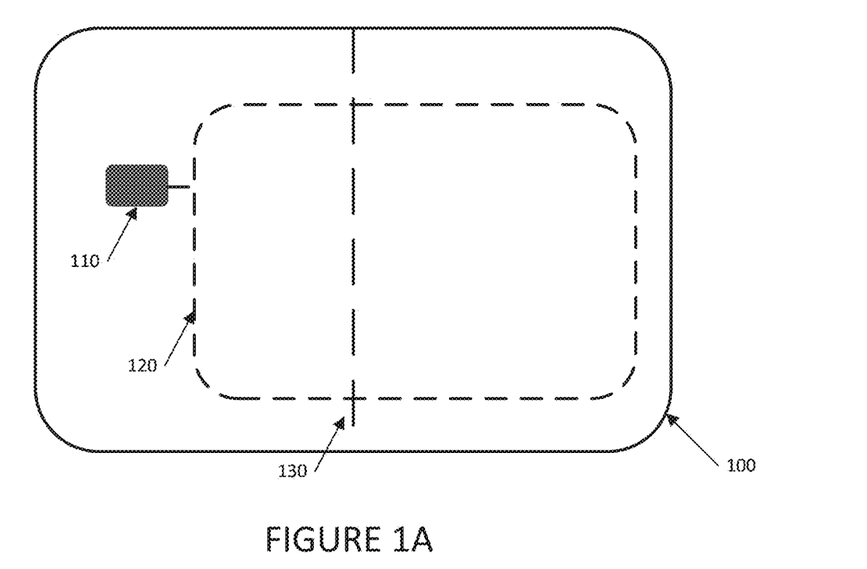
FIGS. 1A, 1B, and 1C illustrate a contactless card with dynamic protection against covert radio frequency reading according to an embodiment.
Figure 1B:
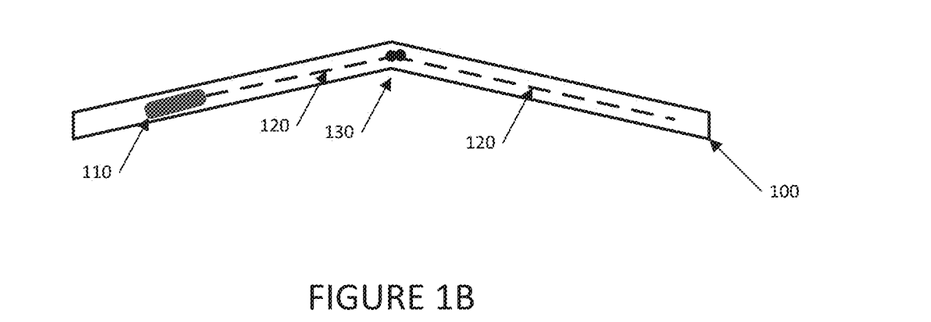
Figure 1C:
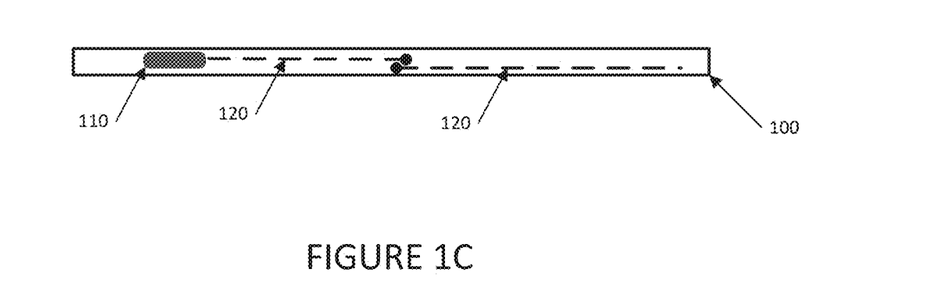

Referring to FIGS. 1A, 1B, and 1C, a contactless card with dynamic protection against covert radio frequency reading is disclosed according to an embodiment. Contactless card 100 may be any sort of card that may be provided with a chip that stores information and an antenna for wirelessly communicating (e.g., by radio frequency) the information to a card reading device. Examples of contactless cards may include payment instruments (e.g., credit card, debit card, etc.), access cards, etc. The information may include financial instrument information, security information, identification information, etc.

Contactless card 100 may be made of any suitable material, including plastic. Contactless card 100 may include chip 110 that may store information (e.g., payment card information, access information, personal information, etc.). Chip 110 may electrically connected to antenna 120, which may be provide within contactless card 100 (e.g., between layers if contactless card 100 is a laminate). An example position of antenna 120 in contactless card 100 is illustrated in FIG. 1A; it should be noted that antenna 120 may have any suitable positioning and orientation within contactless card 100.

Contactless card 100 may be provided with one or more manipulation areas 130. For example, contactless card 100 may be hinged at manipulation area 130 and may have a non-planar orientation (e.g., FIG. 1B) in which contactless card 100 is bent, and a planar orientation (e.g., FIG. 1C) in which contactless card is not bent. In the non-planar orientation, the connection between chip 110 and antenna 120, and/or within antenna 120 is maintained, so that there is an electrical connection and antenna 120 may be used to communicate information from chip 110 to a card reader (not shown). Thus, the non-planar orientation of contactless card 100 may be an active configuration.

When contactless card 100 is in its planar orientation, the connection between chip 110 and antenna 120, and/or within antenna 120, may be broken. Thus, in antenna 120 cannot be used to communicate the information from chip 110 to the reader. Thus, the planar orientation may be an inactive configuration.

In one embodiment, portions of antenna 120 may move relative to each other so that when contactless card 100 is in the inactive configuration, antenna 120 is electrically disconnected. Thus, when the user places contactless card 100 in a wallet or other accessory, a card reader will not be able to read information from chip 110. When the user removes contactless card 100 from the wallet or other accessory, and manipulates contactless card 100 into the active configuration by bending, the electrical connection is established and information may be read from chip 110.

In one embodiment, contactless card 100 may be biased in the non-planar orientation, so that when the user removes contactless card 100 from the wallet or other accessory, any restraints that cause contactless card 100 to be in the inactive configuration are removed, and contactless card 100 may be used to communicate information to the card reader.

In another embodiment, contactless card 100 may be biased in the inactive configuration, and the user may need to manipulate contactless card 100 to the active configuration to use it. Any suitable mechanism for biasing contactless card 100 may be used as is necessary and/or desired.

Manipulation areas 130 may further include bends (e.g., weakened or scored areas), pivot points, etc.

In one embodiment, contactless card 100 may have a plurality of active configurations, and each active configuration may cause antenna 120 to interface with a different chip 110, or may activate a different antenna 120. For example, a plurality of chips 110 may be provided, and each chip 110 may be associated with one of the active configurations of contactless card 100. Thus, the user may select the information to communicate by manipulating contactless card 100 into one of the plurality of active configurations.

Figure 1D:
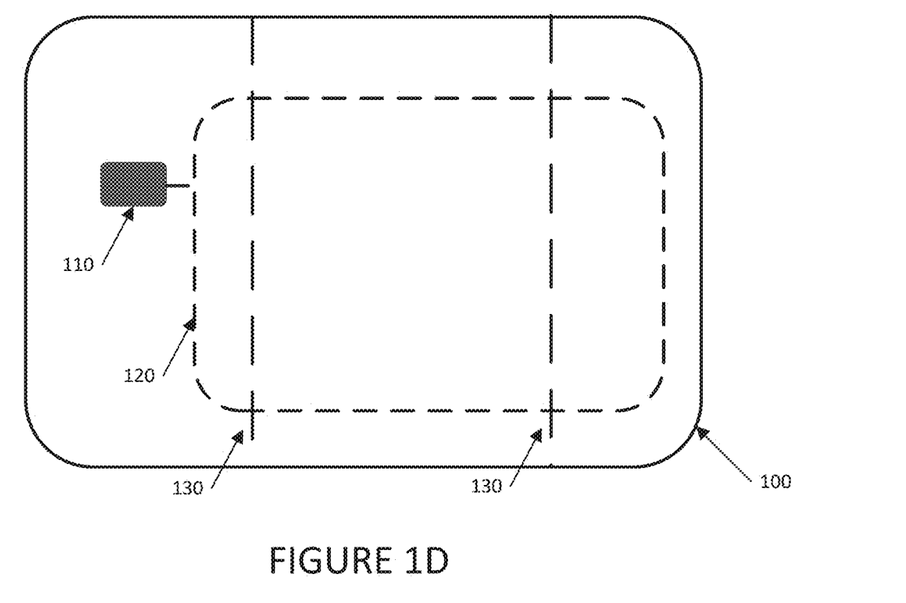
FIGS. 1D, 1E, and 1F illustrate a contactless card with dynamic protection against covert radio frequency reading according to another embodiment.
Figure 1E:
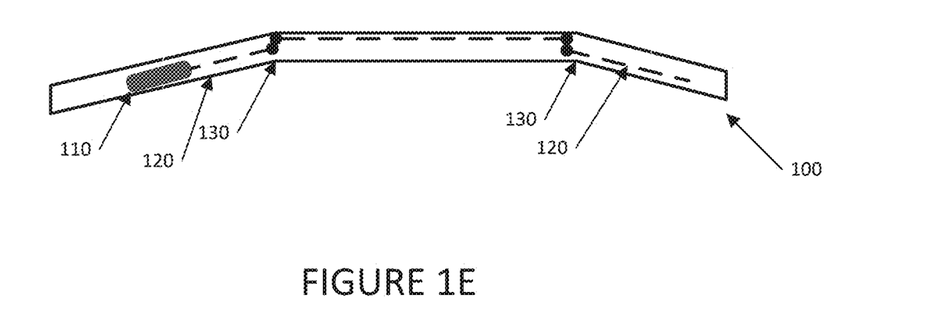
Figure 1F:
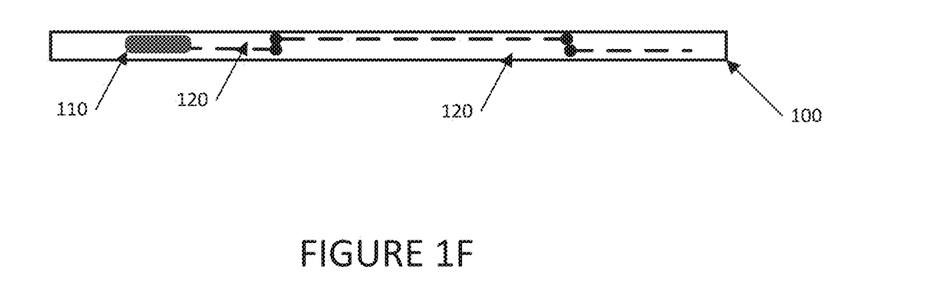

FIGS. 1D, 1E, and 1F disclose a contactless card with dynamic protection against covert radio frequency reading according to an embodiment. In this embodiment, two manipulation areas 130 are provided, allowing contactless card 100 to be manipulated around one or both of manipulation areas 130.

Although embodiments may provide manipulation areas 130 in a vertical orientation, it should be recognized that manipulation areas 130 may be provided in any desired orientation, including horizontal, diagonal, etc.

Figure 2:
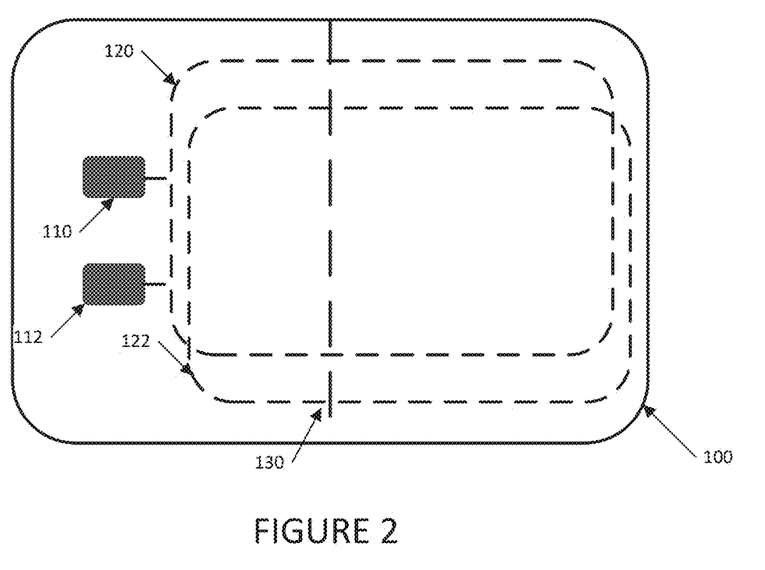
FIG. 2 illustrates a contactless card with dynamic protection against covert radio frequency reading according to another embodiment.

Referring to FIG. 2, in another embodiment, a plurality of antennas 120, 122 may be provided, and each antenna may be provide so that it is only electrically connected in one of the plurality of active configurations. Each antenna 120, 122 may interface with chip 110 or chip 112. Each antenna 120, 122 may have a different length so that each may communicate with a different type of card reader.

Figure 3A:
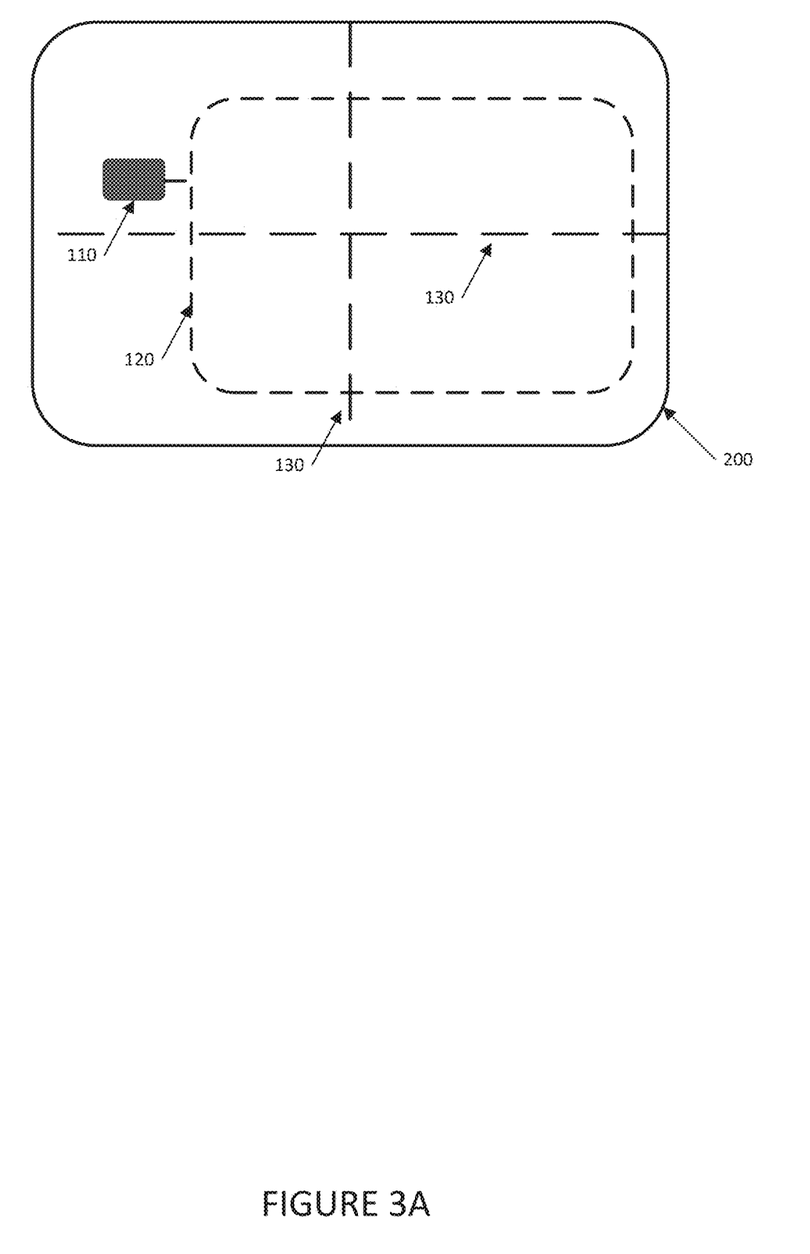
FIGS. 3A and 3B illustrate a contactless card with dynamic protection against covert radio frequency reading according to another embodiment.
Figure 3B:
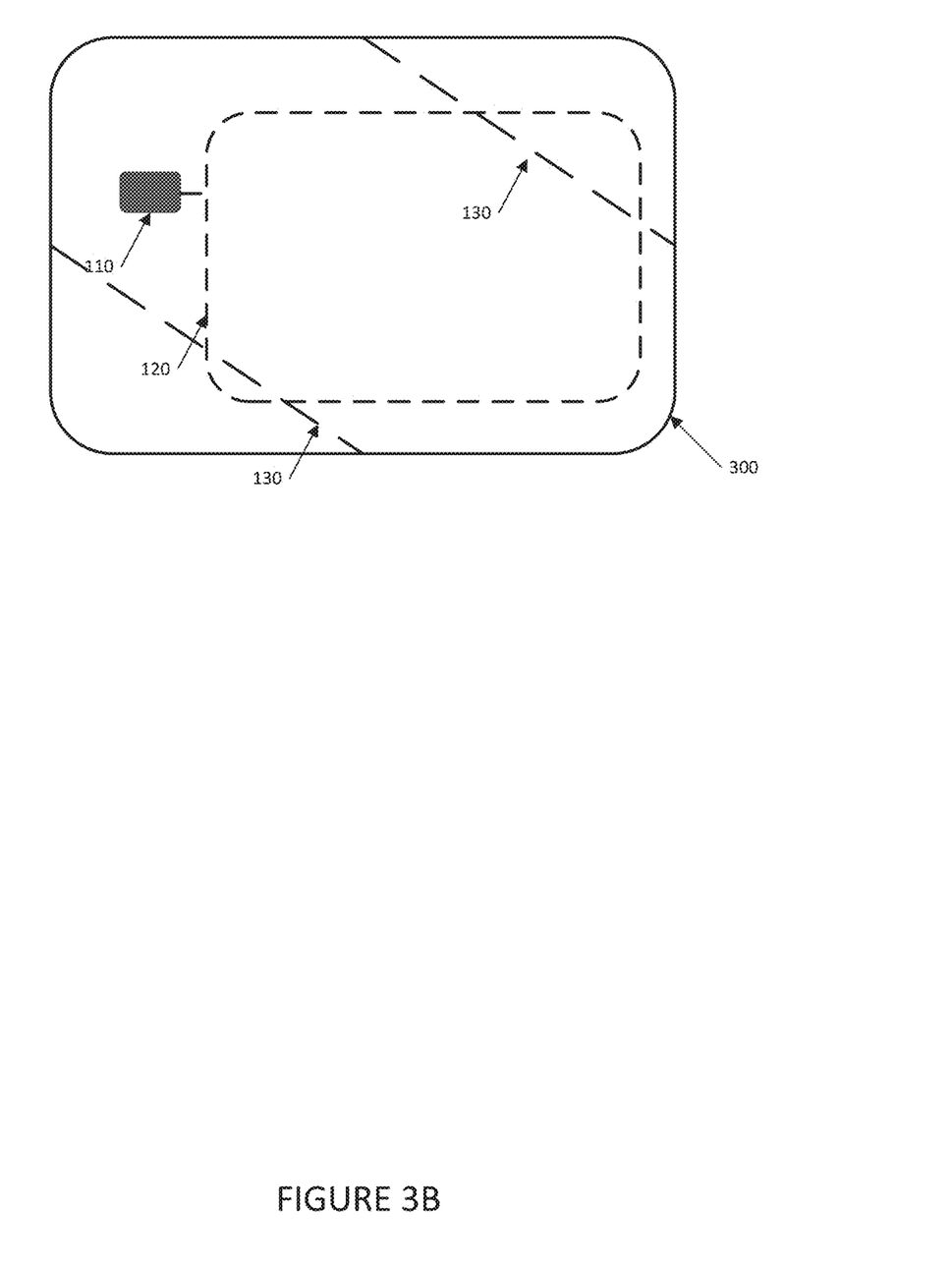

Referring again to FIGS. 1A, 1B, and 1C, manipulation area 130 may be located at any suitable position on contactless card 100, and a plurality of manipulation areas 130 may be provided. Examples of alternate locations for manipulation areas 130 for contactless cards 200 and 300 are shown in FIGS. 3A and 3B. It should be noted that these are exemplary only and other locations for manipulation areas 130 may be used as is necessary and/or desired.

In one embodiment, different antennas 120 or chips 110 may be selected based on the active configuration that is selected. In one embodiment, contactless card 100 may have one manipulation area 130 and the degree of bending may select one of a plurality of chips 110 or antennas 120. A tactile stop may be incorporated to provide feedback to the user as to which chip 110 or antenna 120 is selected.

In another embodiment, the user may select different chips 110 or antennas 120 by manipulating contactless card along a different manipulation area 130. For example, different chips 110 and/or antennas 120 may be selected depending on whether contactless card is manipulated along the vertical manipulation area 130 or the horizontal manipulation area 130.

Figure 4A:
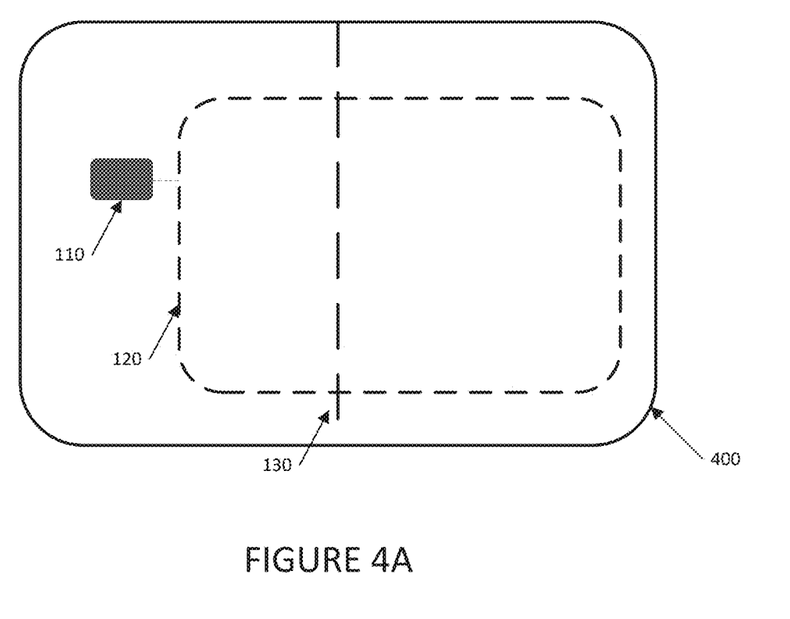
FIGS. 4A, 4B, and 4C illustrate a contactless card with dynamic protection against covert radio frequency reading according to another embodiment.
Figure 4B:
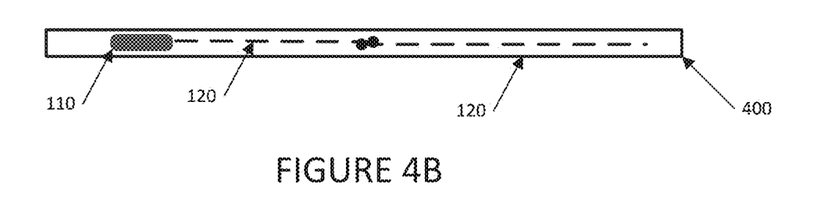
Figure 4C:
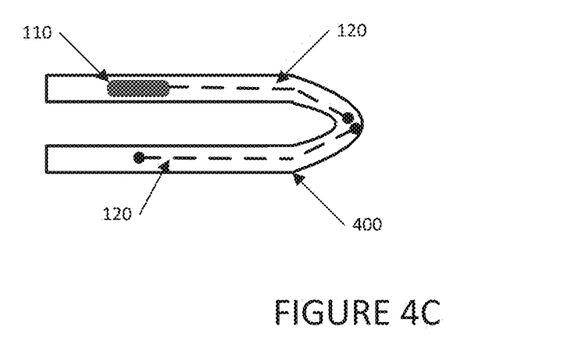

FIG. 4A, 4B, and 4C depict a contactless card with dynamic protection against covert radio frequency reading is disclosed according to an embodiment. Contactless card 400 may be configured so that it may be folded along manipulation area 130. When folded or bent into an inactive configuration, such as is depicted in FIG. 4C, antenna 120 may be electrically disconnected from chip 110 so that information from chip 110 cannot be read via antenna 120. For example, portions of antenna 120 may move relative to each other and may be electrically disconnected. In this configuration or orientation, contactless card 400 may be stored.

When payment card 400 is in an active configuration, such as a planar orientation, such as that in FIG. 4B, the antenna 120 may be electrically connected so that information may be read from chip 110.

Figure 5:
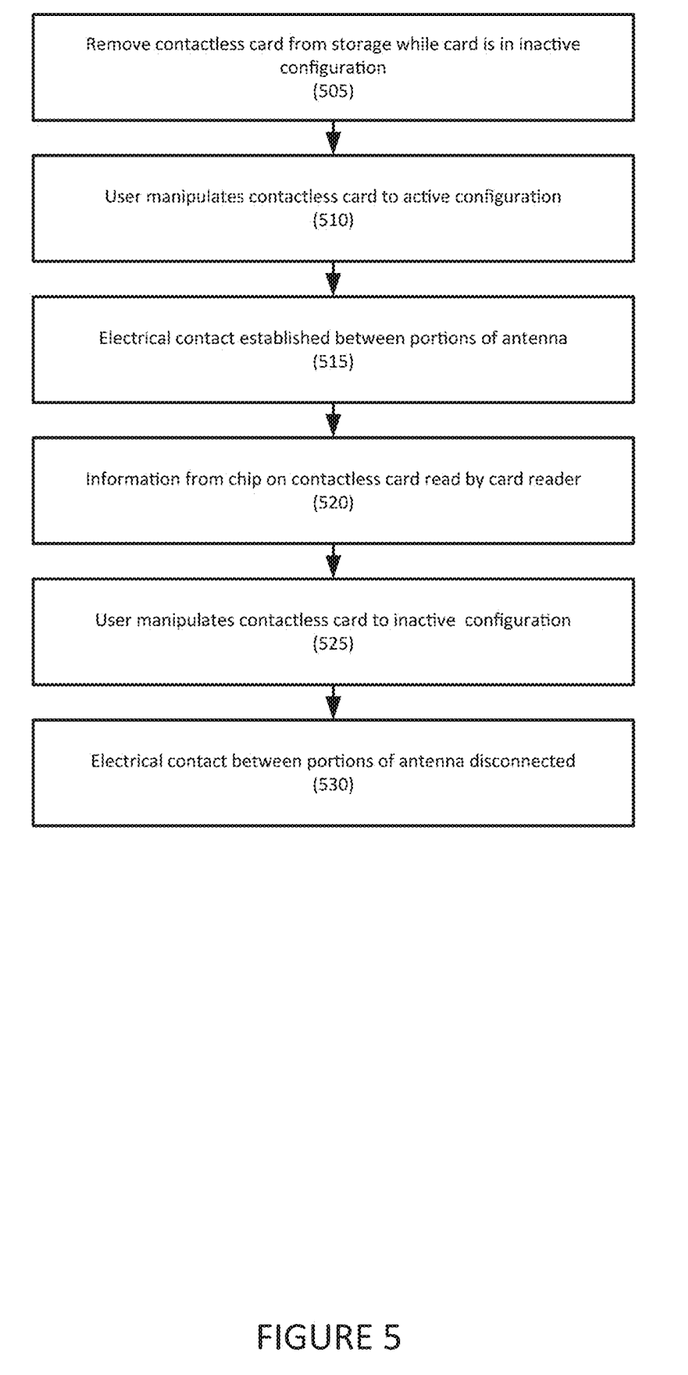
FIG. 5 illustrates a method for using a contactless card with dynamic protection against covert radio frequency reading according to an embodiment.

Referring to FIG. 5, a method for using a contactless card with dynamic protection against covert radio frequency reading is disclosed according to an embodiment.

In step 505, a user may remove a contactless card from storage. While in storage, the contactless card may be maintained in an inactive configuration. In one embodiment, this may be a planar orientation, such as a that caused by the contactless card being positioned within a card slot of a wallet.

In another embodiment, the inactive configuration may be caused by the contactless card being folded or bent along a manipulation line. This may be caused by contactless card being stored along the fold of a wallet, or stored in a folded condition.

In step 510, the user may manipulate the contactless card to an active configuration. In one embodiment, this may be a non-planar orientation, caused by the user bending the contactless card to the active configuration, or the contactless card being biased to the active configuration.

In another embodiment, the user may unfold or straighten the contactless card to the planar orientation.

In one embodiment, the contactless card may have a plurality of manipulation areas around which the contactless card may be manipulated. Each manipulation area 130 may result in a different chip and/or antenna being selected.

In step 515, electrical contact may be established between portions of the antenna and/or the chip. In one embodiment, portions of the antenna may move relative to each other to establish the electrical connection.

In step 520, information from a chip may be ready by a card reader. This may be done using any suitable radio frequency technology, such as Bluetooth, Bluetooth Low Energy, Near Field Communication, etc.

In step 525, the user may manipulate the contactless card back to the inactive configuration.

In step 530, as a result of being in the inactive configuration, electrical contact between portions of the antenna may be disconnected. For example, the portions may move relative to each other, interrupting the electrical connection within the antenna.

Figure 6A:
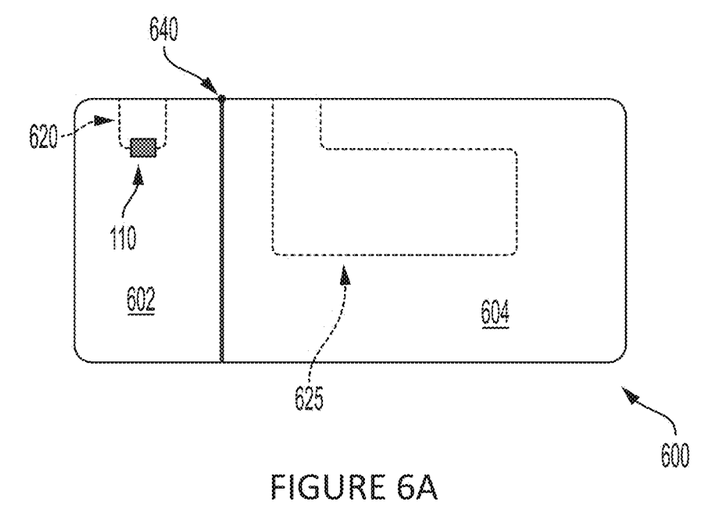
FIGS. 6A, 6B, 6C, and 6D illustrate contactless cards with dynamic protection against covert radio frequency reading according to another embodiments.
Figure 6B:
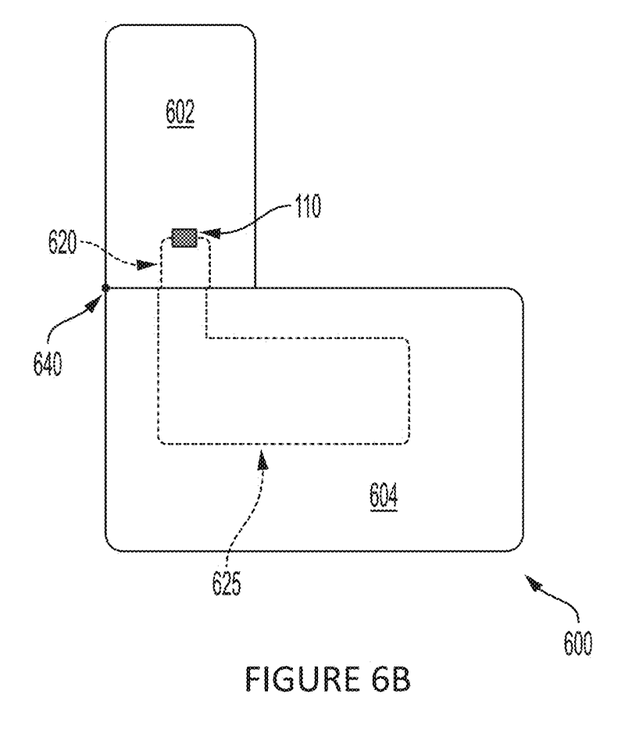

Referring to FIGS. 6A and 6B, a contactless card with dynamic protection against covert radio frequency reading is illustrated according to another embodiment. Contactless card 600 may include two portions—first card portion 602 and second card portion 604—that may be connected via pivot or hinge 640.

First card portion 602 may include first antenna portion 620 of an antenna, and second card portion 604 may include second antenna portion 625 of the antenna. When first card portion 602 is rotated about hinge or pivot 640 to contact second card portion 604, first antenna portion 620 may make electrical contact with second antenna portion 625, thereby allowing information to be read from chip 110.

Figure 6C:
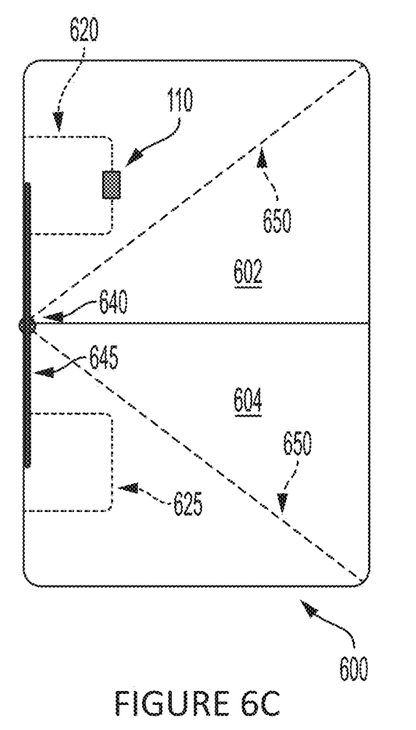
Figure 6D:
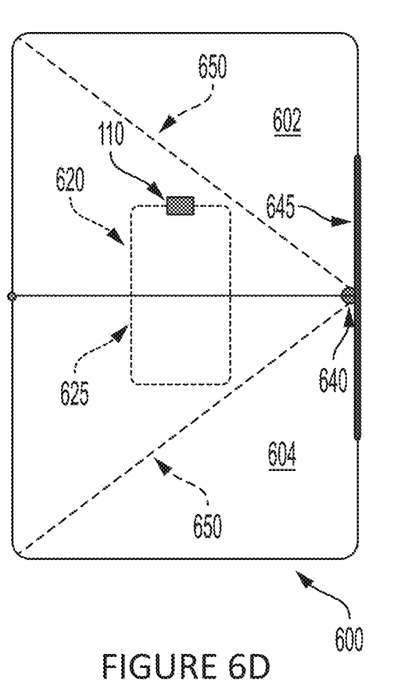
Figure 7A:
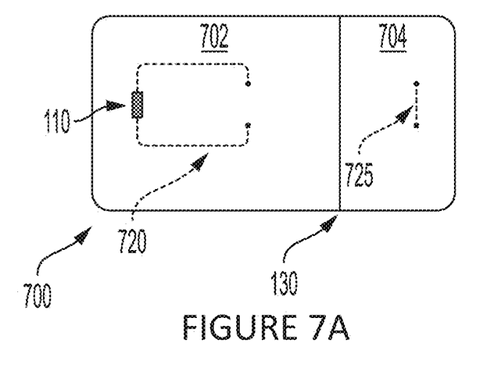
FIGS. 7A, 7B, 7C, 7D, 7E, and 7F illustrate contactless cards with dynamic protection against covert radio frequency reading according to embodiments.
Figure 7B:
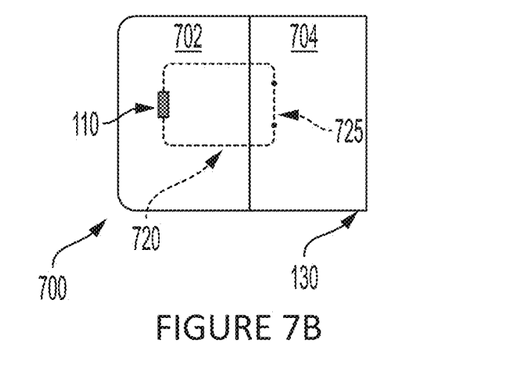
Figure 7C:
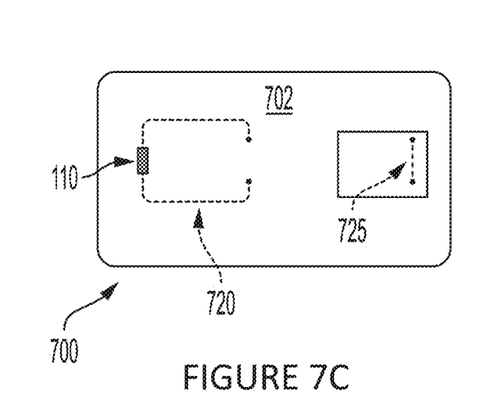
Figure 7D:
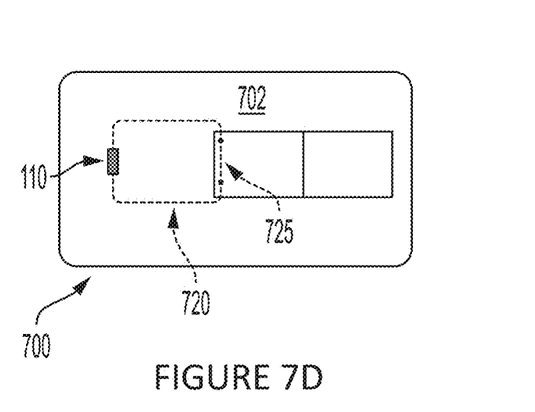
Figure 7E:
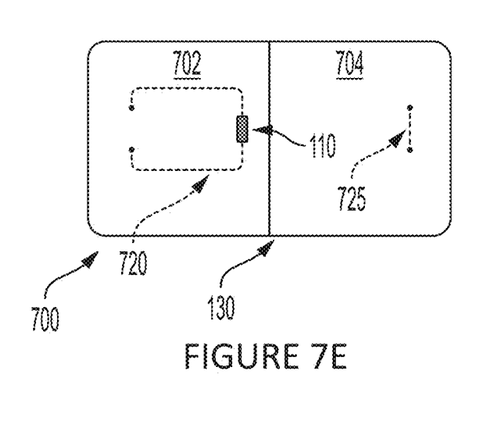
Figure 7F:
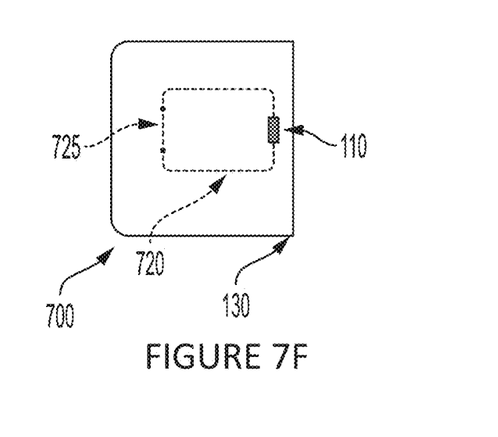

FIGS. 6C and 6D depict a similar arrangement. Pivot or hinge 640 may further include a stabilizer, such as a rigid or semi-rigid rod 645 that may maintain the positions of first card portion 602 and second card portion 604 while in either configuration. Flexible areas 650 may allow first card portion 602 and second card portion 604 to deform as contactless card 600 transitions between configurations.

Referring to FIGS. 7A, 7B, 7C, 7D, 7E, and 7F, contactless cards with dynamic protection against covert radio frequency reading are illustrated according to embodiment. Contactless cards 700 may include first card portions 702 and second card portions 704 that may be manipulated about manipulation points 130. First card portions 702 may include first antenna portion 720 of an antenna, and second card portion 704 may include second antenna portion 725 of the antenna. When first card portion 702 and second card portion 704 are manipulated about manipulation point 130, first antenna portion 720 and second antenna portion 725 may make electrical contact, thereby allowing information to be read from chip 110.

The disclosure of U.S. Design patent application Ser. No. 29/924,533, filed concurrently herewith, is hereby incorporated, by reference, in its entirety.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A contactless card, comprising:
 a first card portion and a second card portion;
 a manipulation area between the first card portion and the second card portion, wherein the contactless card is manipulatable into a plurality of orientations about the manipulation area;
 a chip storing information; and
 an antenna in communication with the chip comprising a first antenna portion in the first card portion and a second antenna portion in the second card portion, wherein the first antenna portion and the second antenna portion are electrically connected when the contactless card is in a first orientation of the plurality of orientations such that the information can be read by radio frequency communication from the chip via the antenna, and the first antenna portion and the second antenna portion are electrically disconnected when the contactless card is in a second orientation of the plurality of orientations such that the information cannot be read by radio frequency communication from the chip via the antenna.

2. The contactless card of claim 1, wherein the first orientation is a non-planar orientation, and the second orientation is a planar orientation.

3. The contactless card of claim 1, wherein the manipulation area comprises a hinge.

4. The contactless card of claim 1, wherein the manipulation area comprises a pivot point.

5. The contactless card of claim 1, wherein the contactless card is biased in the first orientation.

6. The contactless card of claim 1, wherein the contactless card is biased in the second orientation.

7. The contactless card of claim 1, further comprising a second chip storing second information, wherein the antenna is in communication with the chip when the contactless card is in the first orientation such that the information can be read by radio frequency communication from the chip via the antenna, and the antenna is in communication with the second chip when the contactless card is in a third orientation of the plurality of orientations such that the second information can be read by radio frequency communication from the second chip via the antenna.

8. The contactless card of claim 1, wherein the contactless card comprises a financial instrument, and the information comprises financial instrument information.

9. The contactless card of claim 1, wherein the contactless card comprises an access card, and the information comprises identification information.

10. A method, comprising:

receiving a contactless card comprising a first card portion and a second card portion, a manipulation area between the first card portion and the second card portion, wherein contactless card is manipulatable into a plurality of orientations about the manipulation area, a chip storing information, and an antenna in communication with the chip comprising a first antenna portion in the first card portion and a second antenna portion in the second card portion;

manipulating the contactless card into a first orientation of the plurality of orientations, wherein the first antenna portion and these second antenna portion are electrically connected such that the information can be read by radio frequency communication from the chip via the antenna; and manipulating the contactless card into a second orientation of the plurality of orientations, wherein the first antenna portion and these second antenna portion are electrically disconnected when the contactless card such that the information cannot be read by radio frequency communication from the chip via the antenna.

11. The method of claim 10, wherein the first orientation is a non-planar orientation, and the second orientation is a planar orientation.

12. The method of claim 10, wherein the manipulation area comprises a hinge.

13. The method of claim 10, wherein the manipulation area comprises a pivot point.

14. The method of claim 10, wherein the contactless card is biased in the first orientation.

15. The method of claim 10, wherein the contactless card is biased in the second orientation.

16. The method of claim 10, wherein the contactless card further comprises a second chip storing second information, and the method further comprises:

manipulating the contactless card into a third orientation of the plurality of orientations, wherein the first antenna portion and these second antenna portion are electrically connected such that the second information can be read by radio frequency communication from the second chip via the antenna.

17. The method of claim 10, wherein the contactless card comprises a financial instrument, and the information comprises financial instrument information.

18. The method of claim 10, wherein the contactless card comprises an access card, and the information comprises identification information.

* * * * *